June 12, 1956

M. TURCHAN 2,749,810

HYDRAULIC TRACER CONTROLLED ROUTING MACHINE

Filed Dec. 9, 1953

INVENTOR.
MANUEL TURCHAN

BY

*Robert A. Sloman*

ATTORNEY.

June 12, 1956 M. TURCHAN 2,749,810
HYDRAULIC TRACER CONTROLLED ROUTING MACHINE
Filed Dec. 9, 1953 6 Sheets-Sheet 4

INVENTOR.
MANUEL TURCHAN
BY
Robert A. Sloman
ATTORNEY.

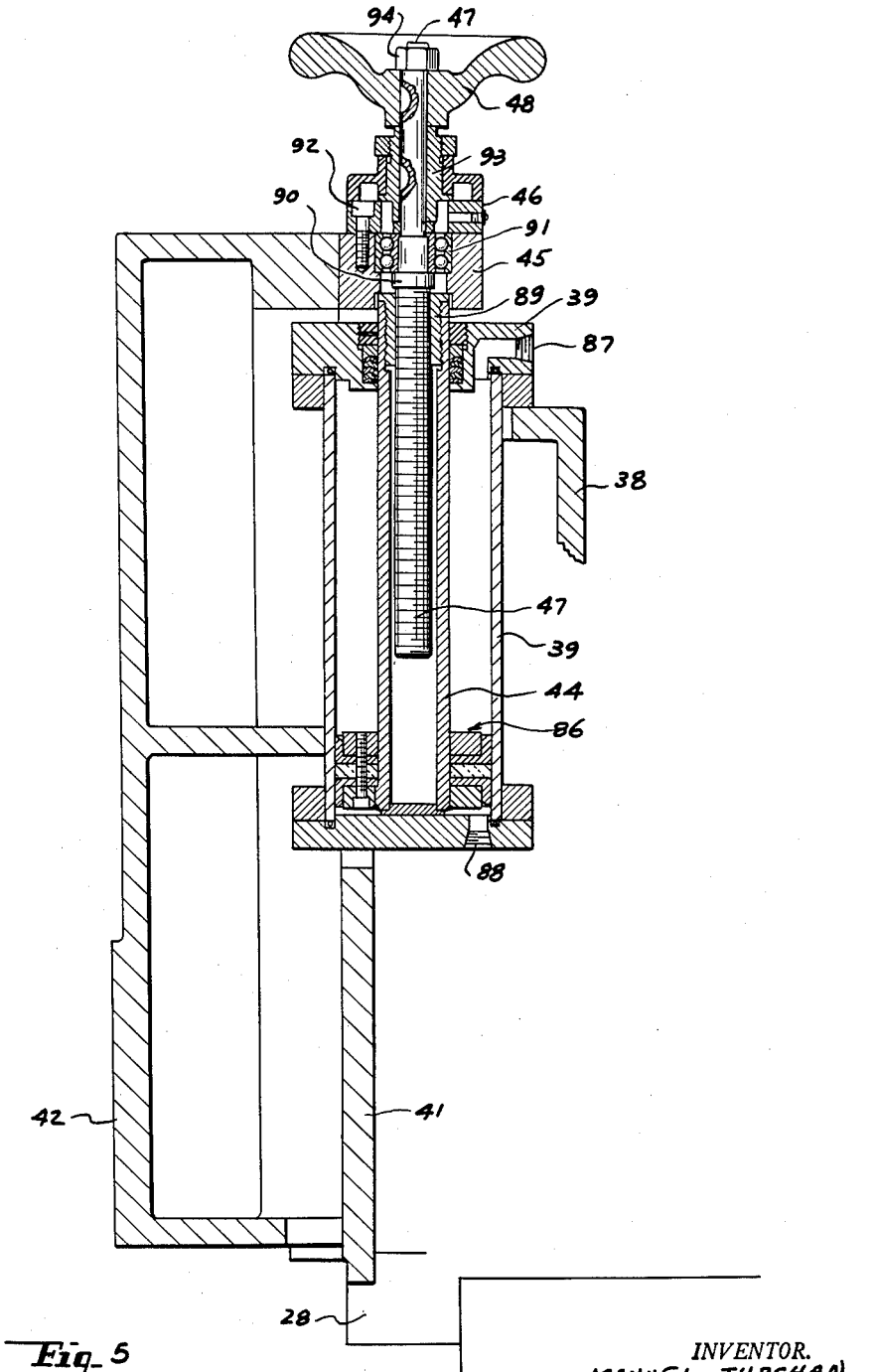

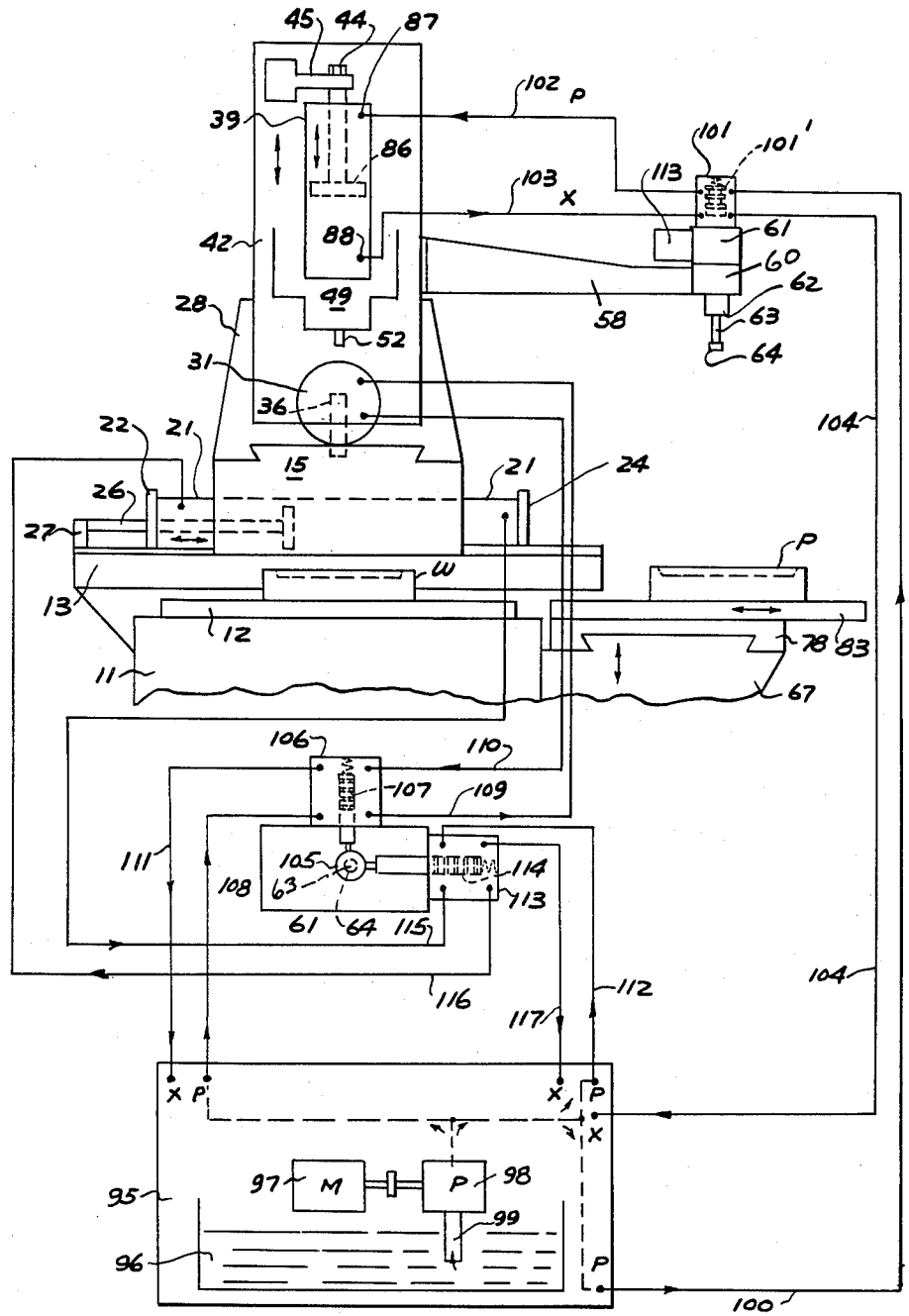

United States Patent Office 2,749,810
Patented June 12, 1956

2,749,810

HYDRAULIC TRACER CONTROLLED ROUTING MACHINE

Manuel Turchan, Dearborn, Mich.

Application December 9, 1953, Serial No. 397,123

3 Claims. (Cl. 90—13.5)

This invention relates to a hydraulic tracer controlled routing machine, and more particularly to a machine tool including a cutter adapted for horizontal movements, cross feed movements and vertical movements with respect to a workpiece, in conjunction with a tracer mechanism cooperable with a pattern and in responding to the surface thereof adapted to control relative feed movements between said cutting tool and workpiece in the aforesaid three directions.

It is the object of the present invention to provide a routing machine whereby upon manually actuating the tracer spindle in any one or more of three directions at right angles to each other, or at any angle, there will be effected corresponding relative feed movements of the cutting tool with respect to a workpiece.

It is the further object of the present invention to provide a three dimensional tracer which is manually applied by an operator to a model or template and in its responses to variations in the shape and contour thereof adapted to effect under hydraulic control corresponding relative feed movements between the cutting tool and a workpiece corresponding to the relative movement of said tracer spindle with respect to said pattern.

It is the further object of the present invention to incorporate a three dimensional tracer in connection with said routing machine which has the directional effect of inducing a feed movement of a cutter supporting slide in a direction corresponding to the direction of pressure manually applied by the operator to the tracer spindle against the surface of the pattern.

It is the further object of the present invention to provide a completely hydraulic device wherein the three slides adapted for effecting relative feed movements of a cutting tool in two directions in a horizontal plane and a third direction in a vertical plane, are all simultaneously under the control of a unitary tracer and responsive to movements of the tracer spindle as it traverses the surface of a pattern, the shape and contour of which is sought to be duplicated in a workpiece.

These and other objects will be seen from the following specification and claims, in conjunction with the appended drawings, in which:

Fig. 5 is an elevational section on an enlarged scale of the vertically adjustable slide and cylinder connected therewith.

Fig. 6 is a diagrammatic illustration of the present routing machine illustrating the hydraulic connections therein.

Figure 1:
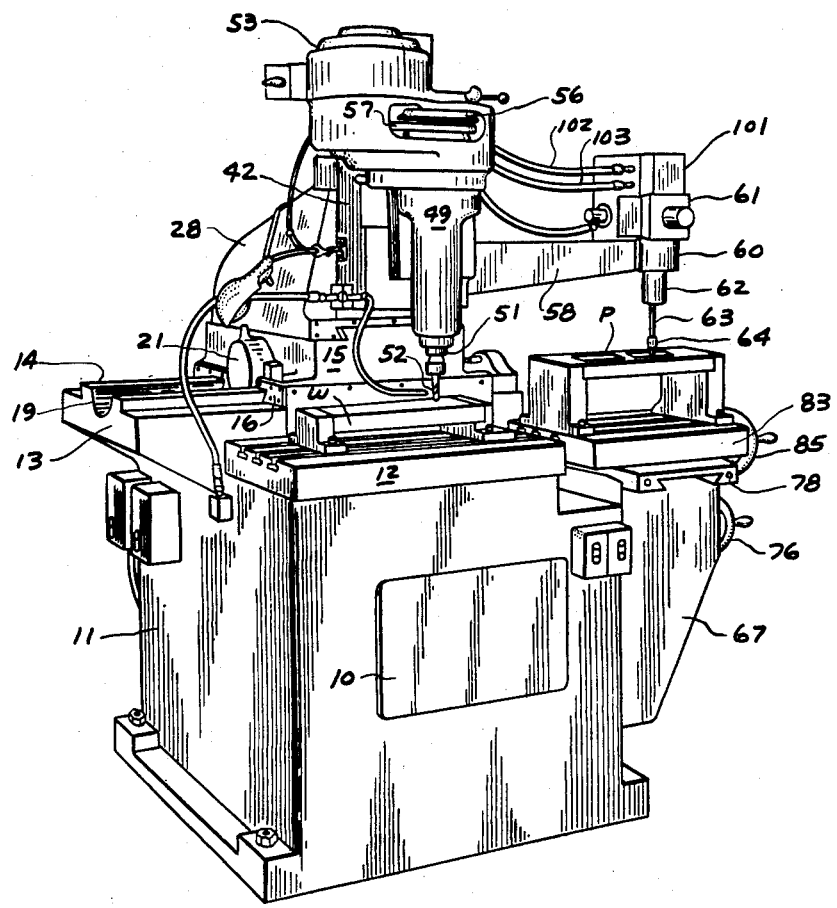
Fig. 1 is a front perspective view of the routing machine incorporating the present invention.

It will be understood that the above drawings illustrate merely a preferred embodiment of the invention, and the other embodiments are contemplated within the scope of the claims hereafter set forth.

Referring to the drawings, the present routing machine includes the upright bed 11, having a horizontally disposed work table 12, upon which is immovably mounted a workpiece W. Rearwardly of said table is provided a saddle 13, having a horizontally disposed dovetail guide 14, which cooperatively and slidably receives the depending dovetail portion 16 of the horizontally reciprocal slide 15.

The saddle 13 has formed in its top surface a substantially semi-circular elongated recess 19; and there is formed within horizontal slide 15 in its undersurface an opposed semi-cylindrical recess 20 within which is positioned hydraulic cylinder 21.

Horizontal slide 15 at its opposite ends and upon opposite sides of cylinder 21 has projections 17 and 18 to which are secured the circular straps 22, as by the bolts 23 for immovably securing said cylinder to the horizontally movable slide 15. The cylinder heads 24 and 25 at opposite ends of said cylinder are slidably positioned within the grooves 19 formed within the saddle 13; the piston rod 26 projecting from one end of said cylinder, is immovably secured to saddle 13 as by the bracket 27.

Figure 2:
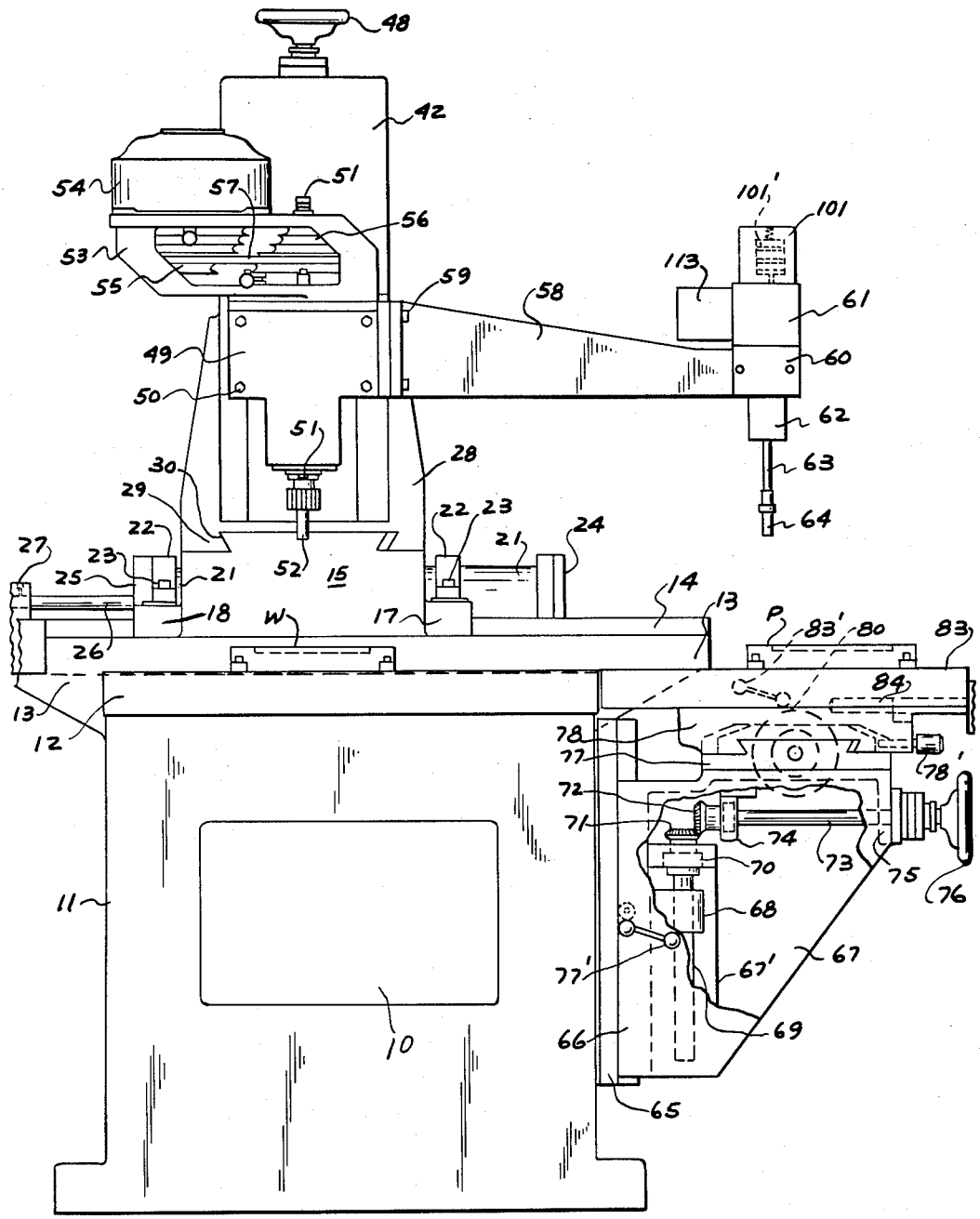
Fig. 2 is a front elevational view thereof.

Slide 15 has transversely formed thereon the horizontally disposed dovetail 30 adapted to cooperatively and slidably receive the dovetail guides 29 depending from horizontally movable cross slide 28 as in Fig. 2.

Figure 3:
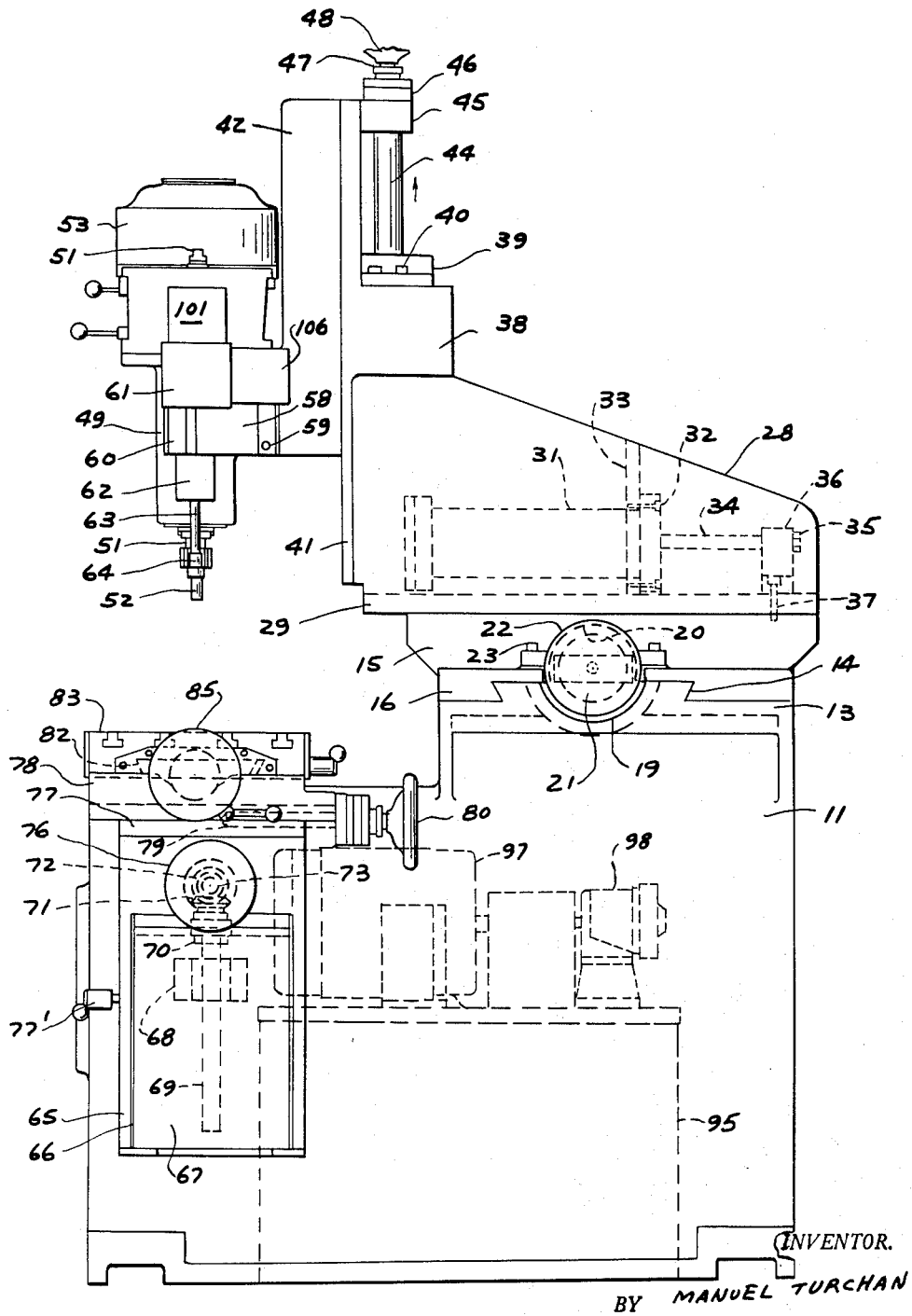
Fig. 3 is a right side elevational view thereof.

As indicated in Fig. 3, cross slide 15 is undercut or so formed as to receive therein the hydraulic cylinder 31, which is immovably secured to said cross slide as by the bolts 32, which threadedly engage the plate formation 33. Here, also, the stationary piston rod 34 projects from the interior of said cylinder and is secured as at 35 to the mounting bracket 36, which is in turn anchored to horizontal slide 15 as at 37. Consequently, and in the manner hereafter provided, the delivery of pressure fluid to one end or the other of cylinder 31 under the control of the tracer 62, will effect reciprocal horizontal adjustments of said cylinder and cross slide 28 secured thereto. Similarly, the cylinder 21 shown in Fig. 2, will also respond to control movements of tracer 62 in the manner hereafter provided and will move longitudinally of the saddle 13 carrying with it horizontal slide 15.

Cross slide 28 has at its forward end the upright support 38, which has an upright guide portion 41, having an upright dovetail slot therein for slidably receiving the dovetail 43 of vertically adjustable slide 42.

Cylinder 39 is disposed substantially within upright slide support 38 and secured thereto by the bolts 40. Cylinder 39 contains therein a vertically adjustable piston 86, Fig. 5, to which is secured the hollow piston rod 44, which extends outwardly of said cylinder and is joined to the bracket element 45 of vertically adjustable slide 42 for effecting vertical adjustments thereof, depending upon the application of pressure fluid to one end or the other of said cylinder through the ports 87 or 88 under the control of the tracer mechanism in the manner hereafter described.

There is provided a screw mechanism in conjunction with the vertically adjustable slide, whereby the same may be manually adjusted with respect to piston rod 44, and to thereby provide for a greater elevation of said slide, as desired.

Referring to Fig. 5, the nut 89 is threaded within the upper end of piston rod 44, and threadedly receives therethrough the screw 47, which extends down into rod 44, and above said nut has a shoulder 90 supportably engageable with the bearings 91 secured within the vertical slide mounting bracket 45 as by the mounting plate 46, which is secured to bracket 45, by the bolts 92.

Screw 47 extends through bearing 91 and through the guide 93 and at its upper end has secured thereto handwheel 48 as by the nut 94.

By this construction and with the piston 86 in any position, vertically adjustable slide 42 may be raised or lowered with respect to piston rod 44 by rotation of handwheel 48.

There is provided a milling head 49 upon the front face of slide 42 secured thereto as by the bolts 50, and having a rotatable spindle 51 from which depends the upright cutter 52.

The milling head 49 includes the housing 53 for the electrical motor 54, whose output shaft carries a series of drive pulleys 55 of different diameter, which are adapted for selective connection with a series of driven pulleys 56 on spindle 51, by means of the belt 57.

As shown in Figs. 1 and 2, there is a horizontally disposed laterally projecting arm 58 secured at one end to slide 42 by the bolts 59, the opposite end of said arm having a bracket 60 within which is supported and mounted the upright three dimensional tracer 61. Said tracer has a depending shank 62, from which extends the universally mounted tracer spindle 63, having a contactor 64 at its lower end adapted for cooperative engagement with the pattern P mounted upon the universally adjustable auxiliary table 83.

The tracer mechanism is a universal type tracer containing a pair of right angularly arranged fluid control valves which are parallel to hydraulic cylinders 21 and 31, and which are adapted to regulate the flow of pressure fluid to one end or the other of said cylinders respectively, in response to universal tilting movements of the spindle 63, as contactor 64 manually traverses the pattern P under the control of an operator.

Said tracer also includes a vertically movable third valve parallel to vertical cylinder 39 and responsive to vertical control movements of spindle 63 for regulating the control of pressure fluid from a fluid pressure source to one end or the other of cylinder 39 through the inlets 87 and 88, Fig. 5, to thereby control the vertical adjustments of cutting tool carrying slide 42.

The tracer mechanism 61—62—63—64 is a three dimensional tracer of the type shown in my copending patent application, Serial Number 386,228, filed October 15, 1953, relating to a Three Dimensional Tracer, and also in my copending patent application Serial Number 338,840, filed February 25, 1953, also relating to a Three Dimensional Tracer.

Though, briefly described hereafter in connection with Fig. 6, as to the general operation of the tracer in controlling the three slides, the complete detail of the tracer mechanism is not described herein.

It is sufficient that the present three dimensional tracer through contactor 64 in responding to variations in the contour of pattern P, will control simultaneously the direction of movement of one or more or all three of the hydraulic cylinders 21, 31 and 39, in turn controlling the reciprocal movements of the three slides, i. e., horizontal slide 15, cross slide 28 and vertical slide 42.

It is important to note that the arrangement of the slides and their controlling cylinders is such that there is a directional effect or relationship between the direction of tilting of tracer contactor 64 under the control of an operator. This is illustrated by the fact that the operator will know that a manual pressure to the right of contactor 64 will effect a movement of horizontal slide 15 to the right; and that a movement to the left of said contactor will cause a movement to the left of said slide. Similarly, a rearward tilting movement of contactor 64 will cause cross slide 28 to move rearwardly; and similarly, a forward tilting movement of said contactor will produce a forward feed movement of cross slide 28. Additionally, an upward axial projection of contactor 64 will cause slide 42 to move up; and a downward movement of said contactor will cause a downward movement of slide 42.

Thus, it can be said that the tracer mechanism in its control of the routing machine has a directional effect upon the movement of the various slides of the routing machine to thereby facilitate the operation thereof, inasmuch as the operator knows exactly in what direction the various slides will move.

The pattern or template P shown in Figs. 1 and 2, is suitably secured by bolts to the auxiliary universally adjustable table 83, which is movable independently of machine bed 11, in three directions at right angles to each other and under manual control. Thus, the pattern may be easily set up for establishing the proper relationship with the tracer at the same time as the cutting tool 52 is brought into cutting relation with workpiece W.

Figure 4:
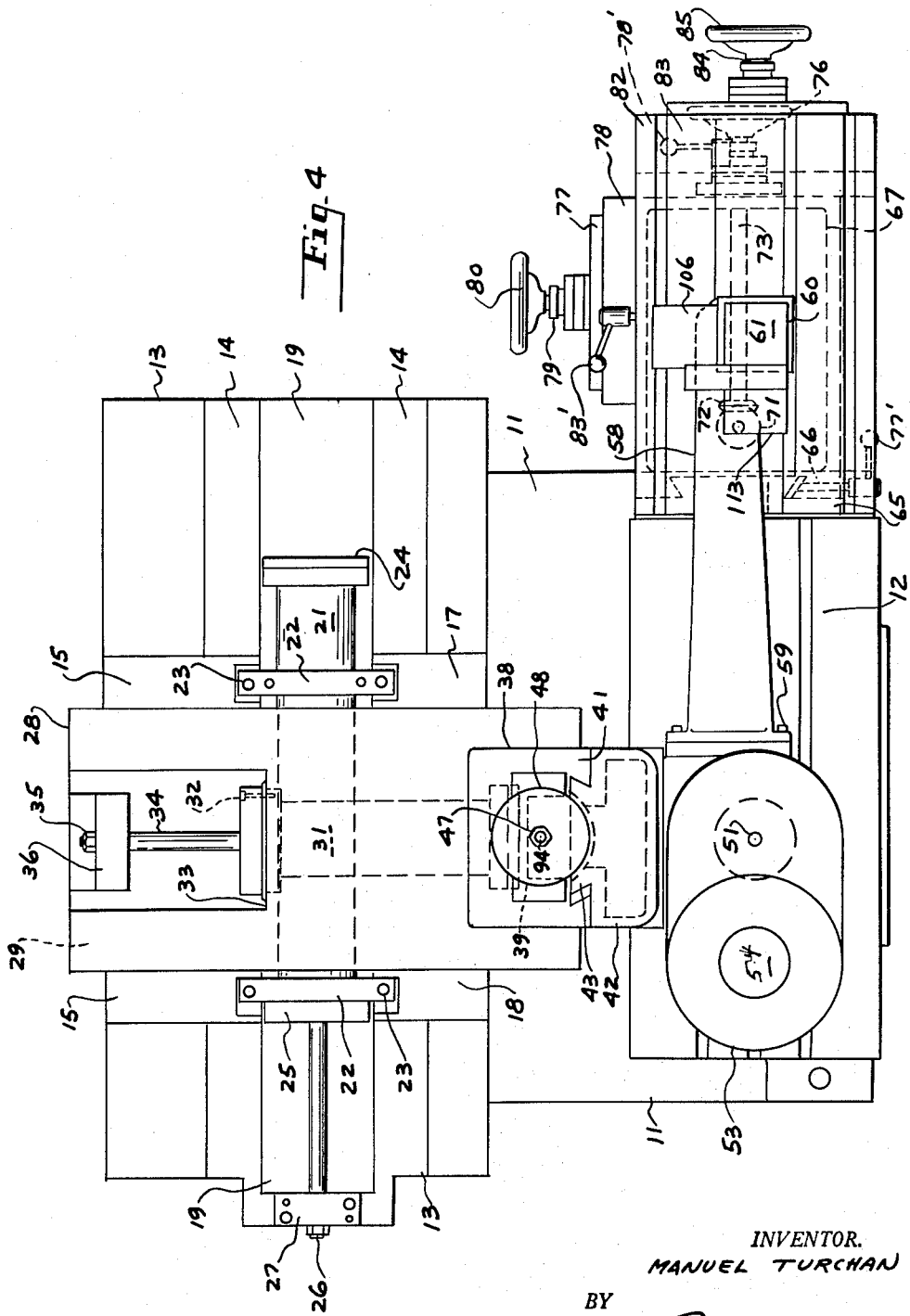
Fig. 4 is a top plan view thereof.

As shown in Figs. 2 and 4, there is provided upon machine bed 11, the upright dovetail guide 65 cooperatively engaged by the slide element 66, which has an upright dovetail recess therein and which forms a part of vertically adjustable knee 67. The nut 68 is secured to bed 11 and is positioned within the slotted portion 67' of said knee and threadedly receives screw 69, which is secured at 70 to said knee. Screw 69 has secured thereto bevel gear 71 in mesh with bevel gear 72 on the inner end of shaft 73, which shaft is supported and journaled through the depending lugs 74 and 75 of the horizontally disposed support 77. Cross slide 78 is mounted upon support 77, there being a suitable dovetail connection between support 77 and slide 78.

Plate 77 has a stationary interiorly threaded nut which receives the screw 79, which is suitably anchored to cross slide 78 and carries at its outer end the handwheel 80. By this construction, rotative movements of said handwheel will effect cross adjustments of the slide 78, upon which is slidably provisioned by a suitable dovetail connection horizontally adjustable pattern mounting slide 83. There is also provided a suitable nut within cross slide 78, which threadedly receives screw 84 joined to slide 83, which screw also has a handwheel 85, by which slide 83 may be manually adjusted.

As shown in Fig. 2, a suitable locking device 77' is provided for securing the knee 67 in adjusted position. A second locking device 78' is shown in Fig. 4, whereby slide 78 may be secured in adjusted position. There is also a third locking device 83' in connection with slide 83, whereby this slide may also be secured in its adjusted position. By this construction, accidental movement of the three slides is prevented once the machine has been set up to do a particular job. The locking devices 77', 78' and 83', are simple camming mechanisms whereby the respective slide is frictionally retained against movement. More particularly, each of the locking devices includes a threaded shaft with a suitable laterally projecting handle upon its outer end. The inner end of the threaded shaft of said locking devices extends through the dovetail portion on each slide and is adapted for frictional locking engagement with the corresponding jib at the dovetail connection.

The bed 11 of the machine is hollow throughout portions thereof, but has suitable cover plates for access to the interior thereof, such as cover plate 10 shown in Fig. 1.

A suitable hydraulic unit 95 is provided within machine bed 11, as indicated in Fig. 3, and in the diagrammatic illustration of Fig. 6, includes a fluid or oil storage sump 96, the electric motor 97, and the pump 98 connected therewith, having an intake pipe 99 extending down into sump 96.

Upon energization of said pump, pressure fluid will be delivered simultaneously to all three of the pressure fluid delivery conduits 100, 108 and 112. These conduits are respectively joined to the three valve bodies 101, 106 and 113, which form a part of the tracer 61, and are joined thereto, each valve body or block having a spring biased fluid control or reverse valve, which is movable longitudinally in the respective valve body and has a series of annular grooves formed therein, as set forth in the copending patent applications above referred to, which valves are all urged into cooperative engagement with a portion of the spindle 63 within the tracer body.

Without describing the operation of each of the valves, in full detail, the three valves are respectively in parallel relationship with the three hydraulic cylinders which they control. The vertically movable valve 101' in axial alignment with spindle 63, is adapted to control the flow of pressure fluid to and from opposite ends of cylinder 39 through the conduits 102 and 103. Depending upon the positioning of the valve in responding to movements of spindle 63, the pressure fluid from delivery pipe 100 will be delivered either through conduit 102 or conduit 103 and the other of said conduits will conduct exhaust fluid from said cylinder back to block 101 for return to the sump 96 through conduit 104. The valve is so constructed and the conduits are so arranged that upward movement of such valve responding to corresponding movement of spindle 63, above a predetermined neutral position will cause an upward feeding of cutter carrying slide 42. Similarly, a movement of such valve 101' below the neutral position will cause slide 42 to feed downwardly. It, therefore, follows that when the motor 97 is energized, there will be a downward feed movement automatically of slide 42 until tracer contactor 64 engages the pattern P. At which time, the correct relationship between cutter 52 and workpiece W will be established, such as by the raising or lowering pattern supporting table 83 and the knee 67, upon which it is mounted.

The tracer mechanism includes a second valve body 106 with a spring-biased valve 107 therein, which is arranged upon a horizontal axis, so that the inner end of the valve 107 has an operative engaging relation with a suitable universally movable contactor 105 carried by spindle 63. There is also provided at right angles to valve body 106, a second horizontally disposed valve body 113, which carries therein a longitudinally adjustable spring-biased valve 114, the inner end of which is in operative engagement with the contactor 105 on said spindle.

Valve body 106 is preferably arranged parallel to the longitudinal axis of hydraulic cylinder 31, whose operation it controls. Valve body 113 is preferably parallel to the longitudinal axis of hydraulic cylinder 21, whose operation it controls.

Consequently, universal tilting movements of the spindle 63 with the contactor 64 movable in any direction in a horizontal plane will effect longitudinal control movements of one or both of the fluid control valves 107 and 114.

Pressure fluid is delivered from pump 98 to valve body 106 by conduit 108, as shown in Fig. 6. This pressure fluid, depending upon the adjustment of valve 107, is delivered to one end or the other of cylinder 31 through one of the two conduits 109 and 110; and the other conduit will return exhaust fluid from the cylinder back to block 106 for subsequent exhausting to the hydraulic unit thru conduit 111.

Pump 98 also delivers pressure fluid through conduit 112 to valve body 113; and depending upon the positioning of valve 114 responding to control movements of contactor 105, said pressure fluid will flow through one of the two supply conduits 115 and 116 to the respective opposite ends of cylinder 21. Exhaust flow from said cylinder returns through the other of the two conduits 115 and 116 back to block 113 for subsequent exhausting through conduit 117 back to the storage sump 96 within hydraulic unit 95.

A more full and complete description of the operation of the three dimensional tracer is set forth in the above described copending applications.

The present three dimensional tracer, however, is a universal type tracer and is manually operated by the operator who places his hand upon the spindle 63 and holds contactor 64 in engagement with the pattern P. Normally, the mechanism is so constructed due to the spring biasing of valve 101' that there will be an initial slight downward pressure of contactor 64 upon the surface of pattern P. The operator is then free to exert a manual thrust of spindle 63 in any desired direction throughout 360 degrees, such as will move the contactor over any portion of the pattern, whose shape is sought to be duplicated by cutter 52 in workpiece W.

In view of the directional feature of the tracer, the operator will know in exactly which direction the cutter will move, inasmuch as the cutter will move in the same direction as the direction of thrust of the operator upon spindle 63 and contactor 64. Even without the pattern, an operator can control the direction of movement in any of the three directions controlled by three cylinders 21, 31 and 39.

Consequently, any resultant direction of movement within a field of 360 degrees may be effected.

An important purpose of screw 47 shown in Fig. 5, is to limit the down-stroke of slide 42, so that the slide in moving in a vertical plane will stop at a pre-determined point without reference to the vertical cylinder controlling valve 101'. This is particularly useful when one is tracing the interior or exterior of a template which has no change in vertical contour.

Having described my invention, reference should now be had to the claims which follow for determining the scope thereof.

I claim:

1. A hydraulic routing machine comprising a bed having a horizontally disposed sadde and a stationary table for supporting a workpiece; a horizontally reciprocal longitudinal slide on said saddle, a hydraulic cylinder joined to and extending through said slide and movable relative to said saddle, a horizontally reciprocal cross-slide movably mounted on said longitudinal slide, a horizontal cylinder joined to and positioned within said cross-slide and movable relatively to said longitudinal slide, a vertically reciprocal slide mounted on said cross-slide and adapted to carry a cutting tool engageable with said workpiece, an upright hydraulic cylinder secured within said cross-slide and having a reciprocal piston rod joined to said vertically reciprocal slide, an arm joined to said vertically movable slide and extending laterally thereof for movement in unison therewith, a hydraulic three dimensional tracer mounted upon and depending from said arm, a spindle universally mounted within said tracer and depending therefrom with its depending end adapted for operative engagement with a pattern on said bed, a pair of horizontally disposed right angularly arranged valves within said tracer engageable with said spindle and adapted to respectively control the flow of pressure fluid from a pressure fluid source to opposite ends of said longitudinal and cross-slide operating cylinders, a third vertically movable valve within said tracer axially of and engageable with said spindle and adapted to control the flow of pressure fluid from said source to the vertical slide operating cylinder, said spindle being manually movable over the surface of said pattern for effecting simultaneous corresponding movements of said cutter on said workpiece for duplicating therein the shape of said pattern, a knee at one end of said bed vertically adjustable thereon, a horizontally disposed cross-slide reciprocally mounted on said knee for movements in a horizzontal plane, and a pattern mounting top slide on said cross slide movable in a horizontal plane at right angles to the direction of movement of said latter cross slide, whereby the pattern may be adjustable manually with respect to said spindle as said cutting tool is moved into cutting relation with said workpiece.

2. A hydraulic routing machine comprising a bed having a horizontally disposed saddle and a stationary table for supporting a workpiece; a horizontally reciprocal longitudinal slide on said saddle, a hydraulic cylinder joined to and extending through said slide and movable relative to said saddle, a horizontally reciprocal cross-slide movably mounted on said longitudinal slide, a horizontal cylinder joined to and positioned within said cross-slide and movable relatively to said longitudinal slide, a vertically reciprocal slide mounted on said cross-slide and adapted to carry a cutting tool engageable with said workpiece, an upright hydraulic cylinder secured within said cross-slide and having a reciprocal piston rod joined to said vertically reciprocal slide, an arm joined to said vertically movable slide and extending laterally thereof for movement in unison therewith, a hydraulic three dimensional tracer mounted upon and depending from said arm, a spindle universally mounted within said tracer and depending therefrom with its depending end adapted for operative engagement with a pattern on said bed, a pair of horizontally disposed right angularly arranged valves within said tracer engageable with said spindle and adapted to respectively control the flow of pressure fluid from a pressure fluid source to opposite ends of said longitudinal and cross slide operating cylinders, a third vertically movable valve within said tracer axially of and engageable with said spindle and adapted to control the flow of pressure fluid from said source to the vertical slide operating cylinder, said spindle being manually movable over the surface of said pattern for effecting simultaneous corresponding movements of said cutter on said workpiece for duplicating therein the shape of said pattern, the movable piston rod of said vertical slide controlling cylinder being hollow, an interiorly threaded nut mounted at the upper end of said rod, a manually rotatable screw threaded into said nut and down into said rod, and a bracket mounting said vertically adjustable slide upon said screw for movement in unison.

3. A hydraulic routing machine comprising a bed having a horizontally disposed saddle and a stationary table for supporting a workpiece; a horizontally reciprocal longitudinal slide on said saddle, a hydraulic cylinder joined to and extending through said slide and movable relative to said saddle, a horizontally reciprocal cross-slide movably mounted on said longitudinal slide, a horizontal cylinder joined to and positioned within said cross-slide and movable relatively to said longitudinal slide, a vertically reciprocal slide mounted on said cross-slide and adapted to carry a cutting tool engageable with said workpiece, an upright hydraulic cylinder secured within said cross-slide and having a reciprocal piston rod joined to said vertically reciprocal slide, an arm joined to said vertically movable slide and extending laterally thereof for movement in unison therewith, a hydraulic three dimensional tracer mounted upon and depending from said arm, a spindle universally mounted within said tracer and depending therefrom with its depending end adapted for operative engagement with a pattern on said bed, a pair of horizontally disposed right angularly arranged valves within said tracer engageable with said spindle and adapted to respectively control the flow of pressure fluid from a pressure fluid source to opposite ends of said longitudinal and cross-slide operating cylinders, a third vertically movable valve within said tracer axially of and engageable with said spindle and adapted to control the flow of pressure fluid from said source to the vertical slide operating cylinder, said spindle being manually movable over the surface of said pattern for effecting simultaneous corresponding movements of said cutter on said workpiece for duplicating therein the shape of said pattern, the connection between said tracer controlled valves and their corresponding cylinders being such that the manually controlled tilting movements of said spindle in any direction throughout 360 degrees relative to said pattern produces a corresponding direction of movement of the cutter relative to said workpiece, said longitudinally movable slide being semi-cylindrically undercut to receive its controlling cylinder, there being a corresponding semi-circular elongated slot in said saddle for cooperatively and slidably receiving said longitudinal slide controlling cylinder.

References Cited in the file of this patent

UNITED STATES PATENTS

| | | |
|---|---|---|
| 2,221,459 | Sassen | Nov. 12, 1940 |
| 2,332,533 | Roehm | Oct. 26, 1943 |
| 2,424,031 | Heer | July 15, 1947 |
| 2,433,005 | Turchan et al. | Dec. 23, 1947 |